(12) United States Patent
Booth

(10) Patent No.: US 12,005,373 B1
(45) Date of Patent: Jun. 11, 2024

(54) SPORTS DISC LOCATOR SYSTEM

(71) Applicant: Richard E Booth, Millersville, PA (US)

(72) Inventor: Richard E Booth, Millersville, PA (US)

( * ) Notice: Subject to any disclaimer, the term of this patent is extended or adjusted under 35 U.S.C. 154(b) by 156 days.

(21) Appl. No.: 17/740,451

(22) Filed: May 10, 2022

(51) Int. Cl.
| | | |
|---|---|---|
| *A63H 33/18* | (2006.01) | |
| *A63H 5/00* | (2006.01) | |
| *A63H 33/22* | (2006.01) | |
| *G01S 19/19* | (2010.01) | |

(52) U.S. Cl.
CPC .............. *A63H 33/18* (2013.01); *A63H 5/00* (2013.01); *A63H 33/22* (2013.01); *G01S 19/19* (2013.01)

(58) Field of Classification Search
CPC .......... A63H 33/18; A63H 5/00; A63H 33/22; G01S 19/19
USPC .............................. 473/588, 589, 491, 46, 47
See application file for complete search history.

(56) References Cited

U.S. PATENT DOCUMENTS

| D478,944 S | 8/2003 | Peterson | |
|---|---|---|---|
| 8,444,513 B2 * | 5/2013 | Cournoyer | A63B 71/00 473/588 |
| 9,320,981 B2 | 4/2016 | Dawson | |
| 9,579,552 B2 * | 2/2017 | Martin | H04W 4/029 |
| 10,150,015 B2 * | 12/2018 | Lee | F21V 33/008 |
| 11,040,254 B1 | 6/2021 | Hill | |
| 11,161,053 B2 * | 11/2021 | Phipps | H04R 1/403 |
| 2006/0183576 A1 * | 8/2006 | Lindsey | A63H 33/26 473/570 |
| 2006/0199682 A1 | 9/2006 | Holms | |
| 2011/0053716 A1 * | 3/2011 | Lewis | A63H 33/18 473/588 |
| 2011/0250819 A1 * | 10/2011 | Tashman | A63H 33/18 446/46 |
| 2013/0303314 A1 * | 11/2013 | Tackett | A63H 33/18 473/571 |
| 2015/0319562 A1 * | 11/2015 | Martin | H04W 4/80 473/588 |

FOREIGN PATENT DOCUMENTS

| WO | 2011133458 | 10/2011 |
|---|---|---|

\* cited by examiner

*Primary Examiner* — Nini F Legesse
(74) *Attorney, Agent, or Firm* — Kyle A. Fletcher, Esq.

(57) ABSTRACT

The sports disc locator system is a flying disk. The sports disc locator system comprises a sports disk, a tracking disk, and a control circuit. The control circuit mounts in the tracking disk. The tracking disk attaches to the sports disk. The sports disc locator system locates the sports disk after the sports disk has been thrown. The control circuit is a beacon. The control circuit generates a visible signal used to locate the sports disk. The control circuit generates an audible signal used to locate the sports disk. The control signal transmits the GPS coordinates of the sports disc locator system to a personal data device.

16 Claims, 4 Drawing Sheets

SPORTS DISC LOCATOR SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of flying disk toys. (A63H33/18)

SUMMARY OF INVENTION

The sports disc locator system is a flying disk. The sports disc locator system comprises a sports disk, a tracking disk, and a control circuit. The control circuit mounts in the tracking disk. The tracking disk attaches to the sports disk. The sports disc locator system locates the sports disk after the sports disk has been thrown. The control circuit is a beacon. The control circuit generates a visible signal used to locate the sports disk. The control circuit generates an audible signal used to locate the sports disk. The control signal transmits the GPS coordinates of the sports disc locator system to a personal data device.

These together with additional objects, features and advantages of the sports disc locator system will be readily apparent to those of ordinary skill in the art upon reading the following detailed description of the presently preferred, but nonetheless illustrative, embodiments when taken in conjunction with the accompanying drawings.

In this respect, before explaining the current embodiments of the sports disc locator system in detail, it is to be understood that the sports disc locator system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the sports disc locator system.

It is therefore important that the claims be regarded as including such equivalent construction insofar as they do not depart from the spirit and scope of the sports disc locator system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
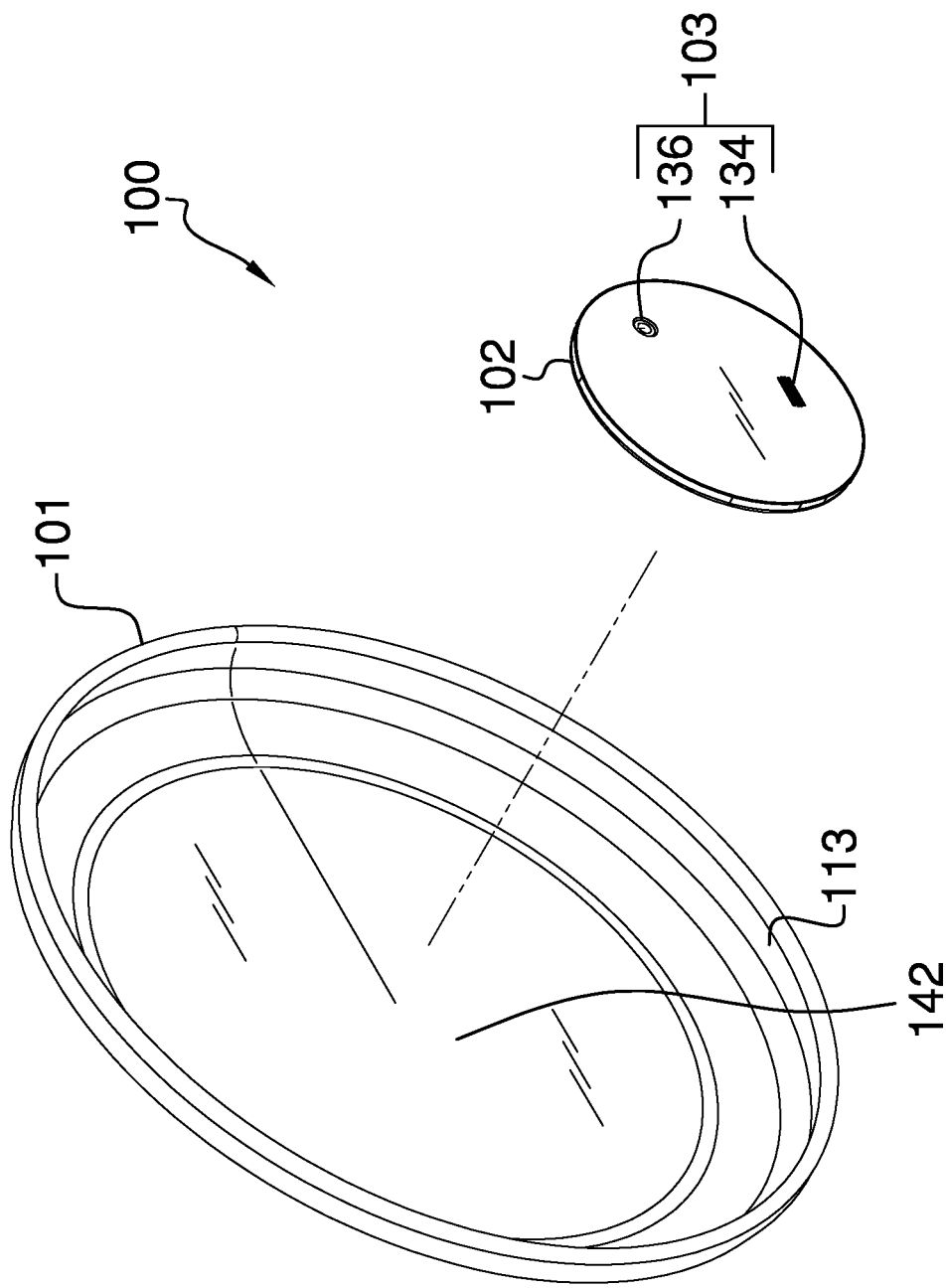
FIG. 1 is an exploded view of an embodiment of the disclosure.
Figure 2:
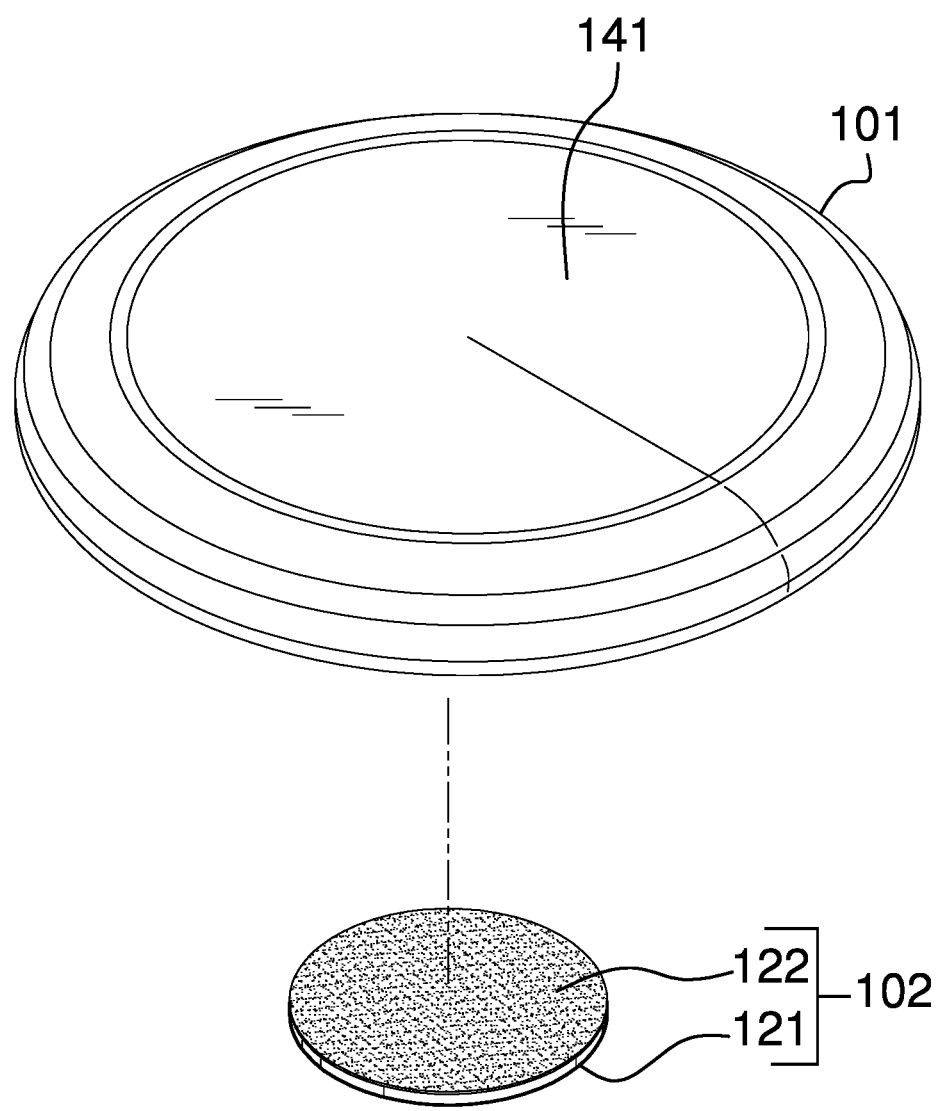
FIG. 2 is a perspective view of an embodiment of the disclosure.
Figure 3:
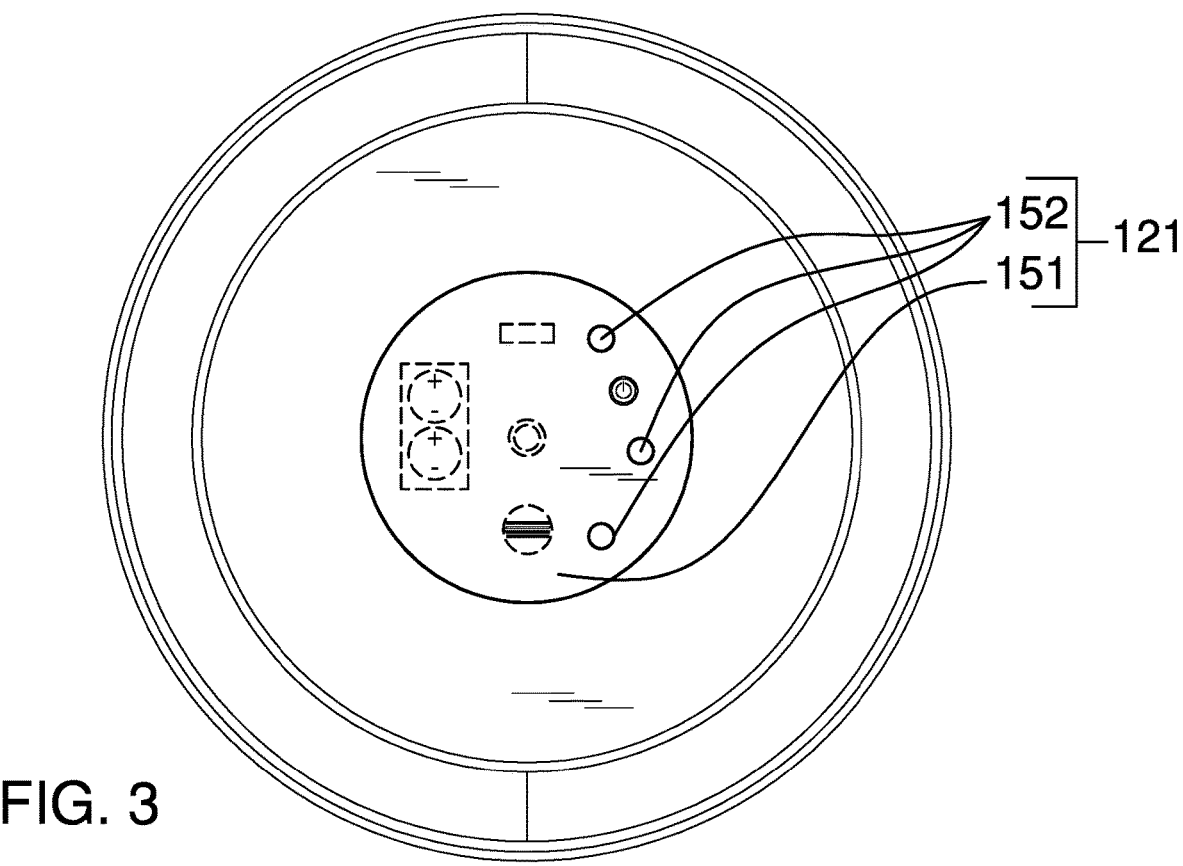
FIG. 3 is a superior view of an embodiment of the disclosure.
Figure 4:
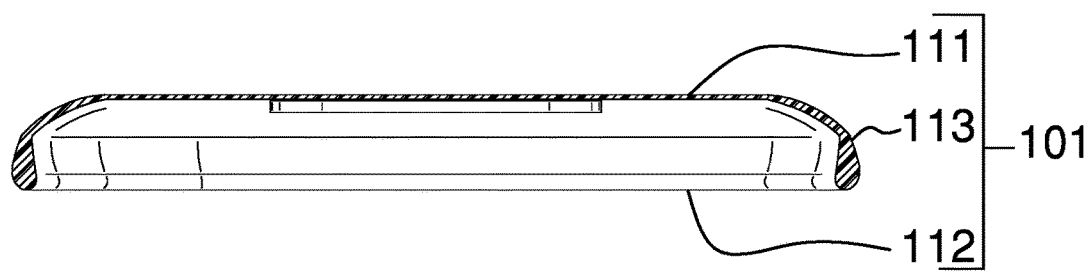
FIG. 4 is a lateral view of an embodiment of the disclosure.
Figure 5:
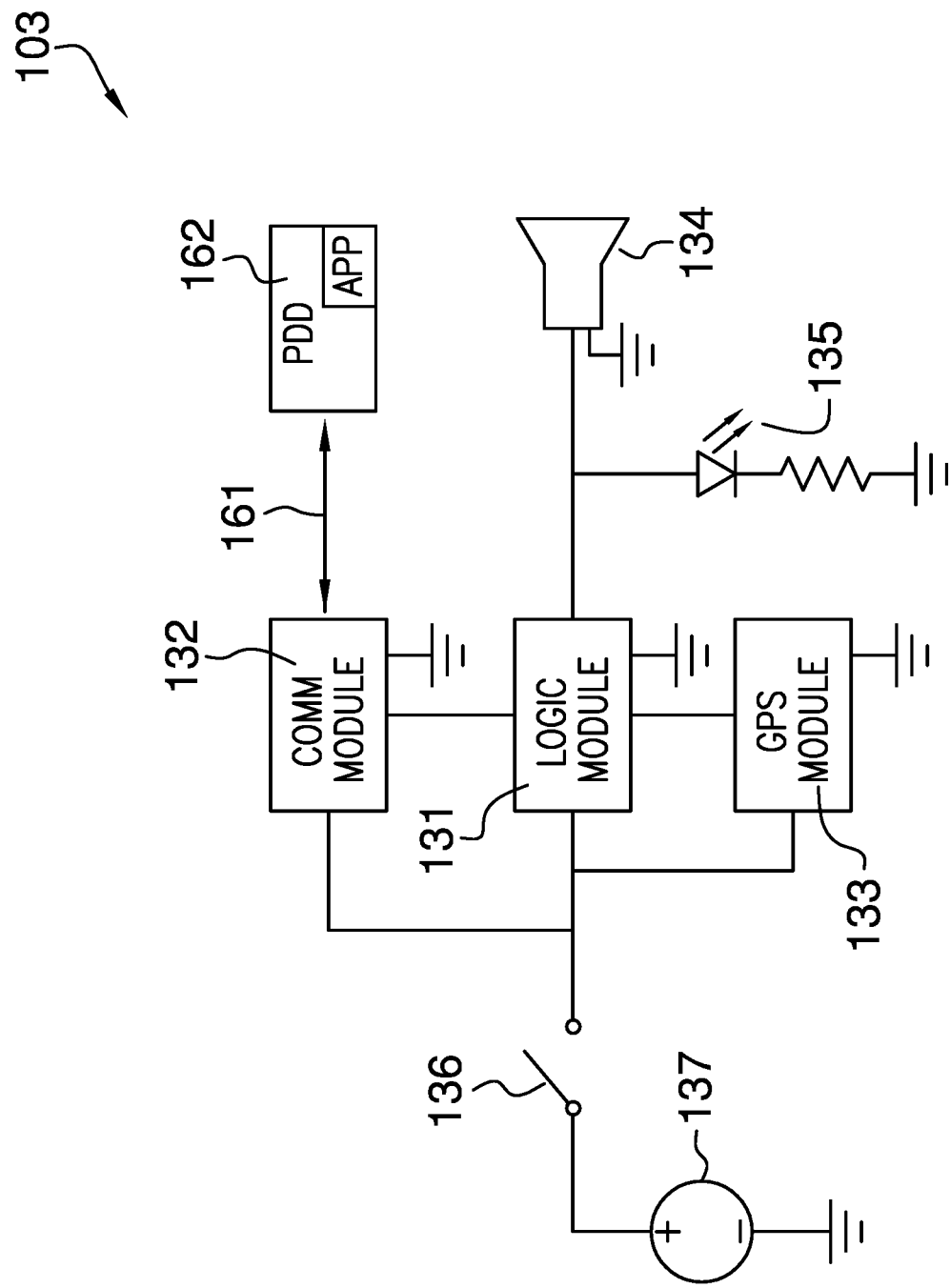
FIG. 5 is a schematic view of an embodiment of the disclosure.

Detailed reference will now be made to one or more potential embodiments of the disclosure, which are illustrated in FIGS. 1 through 5.

The sports disc locator system 100 (hereinafter invention) is a flying disk. The invention 100 comprises a sports disk 101, a tracking disk 102, and a control circuit 103. The control circuit 103 mounts in the tracking disk 102. The tracking disk 102 attaches to the sports disk 101. The invention 100 locates the sports disk 101 after the sports disk 101 has been thrown. The control circuit 103 is a beacon. The control circuit 103 generates a visible signal used to locate the sports disk 101. The control circuit 103 generates an audible signal used to locate the sports disk 101. The control signal transmits the GPS coordinates of the invention 100 to a personal data device 162.

The sports disk 101 is a disk shaped structure. The sports disk 101 is formed with a pan structure. The sports disk 101 is a flying structure. The sports disk 101 is defined elsewhere in this disclosure. The sports disk 101 comprises a closed face 111, an open face 112, and a lateral face structure 113.

The closed face 111 is the closed face 111 of the pan structure of the sports disk 101. The closed face 111 forms the superior surface of the sports disk 101 as the sports disk 101 flies through the air. The open face 112 is the open face 112 of the pan structure of the sports disk 101. The closed face 111 further comprises an exterior surface 141 and an interior surface 142.

The exterior surface 141 is the surface of the closed face 111 that forms the outer surface of the pan shape of the sports disk 101. The exterior surface 141 forms the superior surface of the sports disk 101 when the invention 100 flies through the air. The interior surface 142 forms the surface of the closed face 111 that forms the boundary of the hollow space formed by the pan structure of the sports disk 101. The interior surface 142 is the surface of the closed face 111 that is distal from the exterior surface 141.

The open face 112 forms the inferior surface of the sports disk 101 as the sports disk 101 flies through the air. The open face 112 is the face of the sports disk 101 that is distal from the closed face 111.

The lateral face structure 113 attaches to the interior surface 142 of the closed face 111. The lateral face structure 113 forms a structure that projects away from the closed face 111 in the inferior direction as the sports disk 101 flies through the air. The lateral face structure 113 acts as a stabilizing structure that prevents the sports disk 101 from flipping during flight.

The tracking disk 102 is a disk shaped structure. The tracking disk 102 attaches to the interior surface 142 of the closed face 111 of the sports disk 101. The tracking disk 102 is geometrically similar to the closed face 111 of the interior surface 142 such that the tracking disk 102 sits flush against the interior surface 142. The control circuit 103 is contained within the tracking disk 102. The tracking disk 102 secures the control circuit 103 to the interior surface 142 of the closed face 111 of the sports disk 101. The tracking disk 102 attaches to the sports disk 101 such that the center axis of the disk shape of the tracking disk 102 aligns with the center axis of the disk shape of the sports disk 101. The center axes of the tracking disk 102 and the sports disk 101 align with the axis of rotation of the sports disk 101 when the sports disk 101 flies through the air. The tracking disk 102 comprises a disk housing 121 and an adhesive 122.

The adhesive 122 is a chemical compound. The adhesive 122 is applied to the face of the disk housing 121 that is geometrically similar to the interior surface 142 of the closed face 111. The adhesive 122 adheres the disk housing 121 to the interior surface 142.

The disk housing 121 is a disk shaped structure. The disk housing 121 forms the primary shape of the tracking disk 102. The disk housing 121 forms the structure that contains the control circuit 103. The disk housing 121 attaches to the interior surface 142 of the closed face 111 of the sports disk 101. The disk housing 121 is geometrically similar to the interior surface 142 of the closed face 111 such that the disk housing 121 sits flush against the interior surface 142. The control circuit 103 is contained within the disk housing 121. The disk housing 121 secures the control circuit 103 to the interior surface 142 of the closed face 111 of the sports disk 101. The disk housing 121 attaches to the sports disk 101 such that the center axis of the disk shape of the disk housing 121 aligns with the center axis of the disk shape of the sports disk 101. The center axes of the disk housing 121 and the sports disk 101 align with the axis of rotation of the sports disk 101 when the sports disk 101 flies through the air.

The disk housing 121 further comprises disk structure 151 and a plurality of balancing weights 152. The disk structure 151 is a disk shaped structure. The disk structure 151 is the mechanical structure that forms the primary shape of the tracking disk 102. The control circuit 103 mounts in the disk structure 151. Each balancing weight selected from the plurality of balancing weights 152 mounts in the disk structure 151. Each balancing weight selected from the plurality of balancing weights 152 is a disk shaped structure. Each balancing weight selected from the plurality of balancing weights 152 forms a mass that is contained within the disk structure 151. The position, size and weight of each balancing weight selected from the plurality of balancing weights 152 is selected such that the center of mass of the combination disk housing 121 and the control circuit 103 aligns with the center axis of the disk shape of the disk housing 121.

The control circuit 103 is an electric circuit. The control circuit 103 forms the beacon that identifies the location of the invention 100. The control circuit 103 generates a visible light used to identify the location of the invention 100. The control circuit 103 generates an audible sound used to identify the location of the invention 100. The control circuit 103 determines the GPS coordinates of the invention 100. The control circuit 103 transmits the GPS coordinates of the invention 100 to a personal data device 162.

The control circuit 103 comprises a logic module 131, a communication module 132, a GPS module 133, a speaker 134, a lamp circuit 135, a power switch 136, and a power source 137. The logic module 131, the communication module 132, the GPS module 133, the speaker 134, the lamp circuit 135, the power switch 136, and the power source 137 are electrically interconnected. The communication module 132 further comprises a wireless communication link 161 and a personal data device 162. The communication module 132 forms the wireless communication link 161 between the control circuit 103 and the personal data device 162.

The logic module 131 is a readily and commercially available programmable electronic device that is used to manage, regulate, and operate the control circuit 103. Depending on the specific design and the selected components, the logic module 131 can be a separate component within the control circuit 103 or the functions of the logic module 131 can be incorporated into another component within the control circuit 103. The communication module 132 is a wireless electronic communication device that allows the logic module 131 to wirelessly communicate with a personal data device 162. Specifically, the communication module 132 establishes a wireless communication link 161 between the control circuit 103 and the personal data device 162. In the first potential embodiment of the disclosure the communication module 132 supports a communication protocol selected from the group consisting of a WiFi™ protocol or a Bluetooth™ protocol.

The GPS module 133 is an electrical device that communicates with the GPS to determine the GPS coordinates of the GPS module 133. When queried by the logic module 131, the GPS module 133 transfers the GPS coordinates to the logic module 131.

The personal data device 162 is a programmable electrical device. The personal data device 162 further comprises an application. The personal data device 162 provides data management and communication services through one or more functions referred to as an application. The application is a set of logical operating instructions that are performed by the personal data device 162. The addition of an application will provide increased functionality for the personal data device 162. This disclosure assumes that an application exists for the purpose of interacting with the invention 100. Methods to design and implement an application on a personal data device 162 are well known and documented in the electrical arts. The application of the personal data device 162 forms an interface between the control circuit 103 and a personal data device 162 using the invention 100.

The personal data device 162 transmits operating instructions over the wireless communication link 161 to the control circuit 103. The communication module 132 receives the transmitted operating instructions and relays the received operating instructions to the logic module 131. The personal data device 162 transmits instructions to the logic module 131 that: a) initiate the illumination of the lamp circuit 135 and an announcement by the speaker 134; and, b) extinguishes the illumination of the lamp circuit 135 and discontinues the announcement by the speaker 134. The personal data device 162 further transmits instructions to the logic module 131 initiating the logic module 131 to: a) query the GPS module 133 for the GPS coordinates of the GPS module 133; and, b) transmit the received GPS coordinates over the wireless communication link 161 to the personal data device 162.

The communication module 132 electrically connects to the logic module 131. The logic module 131 controls the operation of the communication module 132. The GPS module 133 electrically connects to the logic module 131. The logic module 131 controls the operation of the GPS module 133. The speaker 134 electrically connects to the logic module 131. The logic module 131 controls the operation of the speaker 134. The lamp circuit 135 electrically connects to the logic module 131. The logic module 131 controls the operation of the lamp circuit 135. The logic module 131 receives operating instructions from the personal data device 162 through the communication module 132. The logic module 131 transmits the GPS coordinates of the GPS module 133 to the personal data device 162 through the communication module 132.

The speaker 134 is transducer. The speaker 134 converts electric energy into an audible sound. The speaker 134 electrically connects to the logic module 131. The speaker 134 receives electric energy from the logic module 131. The speaker 134 converts the received energy into an audible sound used to locate the invention 100. In the first potential embodiment of the disclosure, the speaker 134 is a buzzer.

The lamp circuit 135 is an electric circuit. The lamp circuit 135 electrically connects to the logic module 131. The lamp circuit 135 receives electric energy from the logic module 131. The lamp circuit 135 converts the received energy into a visible illumination used to locate the logic module 131.

The power switch 136 is a maintained switch. The power switch 136 controls the flow of electric energy out of the power source 137. The power switch 136 controls the flow of electric energy into the logic module 131. The power switch 136 controls the flow of electric energy into the communication module 132. The power switch 136 controls the flow of electric energy into the GPS module 133. By controlling the flow of electric energy is meant that the power switch 136 enables and disables the flow of electric energy into the logic module 131, the communication module 132, and the GPS module 133.

The power source 137 is an externally provided source of electric energy. In the first potential embodiment of the disclosure, the power source 137 is a battery.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Application or App: As used in this disclosure, an application or app is a self-contained piece of software that is especially designed or downloaded for use with a personal data device.

Battery: As used in this disclosure, a battery is a chemical device consisting of one or more cells, in which chemical energy is converted into electricity and used as a source of power. Batteries are commonly defined with a positive terminal and a negative terminal.

Beacon: As used in this disclosure, a beacon refers to a detectable signal that draws the attention of a person or a device to a location. A beacon is commonly used as a guide to the location or as a warning signal about the location.

Bluetooth™: As used in this disclosure, Bluetooth™ is a standardized communication protocol that is used to wirelessly interconnect electronic devices.

Buzzer: As used in this disclosure, a buzzer is two lead electrical device that generates an audible sound when voltage is applied to the two leads.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Mass: As used in this disclosure, the center of mass refers to a point within a structure wherein a force applied to the point will cause the structure to move without rotation. The center of mass is commonly, but not always, the first moment of the structure normalized by the mass of the structure. While there are technical differences, the center of gravity of an object can be considered a synonym for the center of mass when the object is contained within the atmosphere of the earth.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Communication Link: As used in this disclosure, a communication link refers to the structured exchange of data between two objects.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

GPS: As used in this disclosure, and depending on the context, GPS refers to: a) a system of navigational satellites that are used to determine the position, known as GPS coordinates, and velocity of a person or object; b) the system of navigational satellites referred to in the first definition that are used to synchronize to global time; or, c) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

LED: As used in this disclosure, an LED is an acronym for a light emitting diode. A light emitting diode is a diode that is also a light source.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Maintained Switch: As used in this disclosure, a maintained switch is a switch that maintains the position that was set in the most recent switch actuation. A maintained switch works in an opposite manner to a momentary switch.

Mass: As used in this disclosure, refers to a quantity of matter within a structure. Mass is measured and quantified by the reaction of the structure to a force. Mass can also be roughly quantified as a function of atomic composition and the number of atoms contained within the structure. The term weight refers to the quantification of a mass that is exposed to the force of gravity.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

PDD: As used in this disclosure, PDD is an acronym for personal data device.

Perimeter: As used in this disclosure, a perimeter is one or more curved or straight lines that bounds an enclosed area on a plane or surface. The perimeter of a circle is commonly referred to as a circumference.

Personal Data Device: As used in this disclosure, a personal data device is a handheld logical device that is used for managing personal information and communication. Examples of personal data device include, but are not limited to, cellular phones, tablets, and smartphones.

Primary Shape: As used in this disclosure, the primary shape refers to a description of the rough overall geometric shape of an object that is assembled from multiple components or surfaces.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rim: As used in this disclosure, a rim is an outer edge or border that follows along the perimeter of an object.

Speaker: As used in this disclosure, a speaker is an electrical transducer that converts an electrical signal into an audible sound.

Sports Disk: As used in this disclosure, a sport disk refers to a disk shaped pan structure. The sports disk is designed such that the sports disk will fly through the air when the sports disk is thrown. The sports disk is thrown such that: a) the closed face of the pan structure of the sports disk forms the superior surface of the flying sports disk; b) the open face of the pan structure of the sports disk forms the inferior face of the flying sports disk; and c) the open face and the closed face of the pan structure of the sports disk are roughly perpendicular to the force of gravity. During its flight, the sports disk rotates (or spins) around an axis of rotation that aligns with the center axis of the disk structure of the sports disk. The sports disk is also referred to as a flying disk.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transducer: As used in this disclosure, a transducer is a device that converts a physical quantity, such as pressure or brightness into an electrical signal or a device that converts an electrical signal into a physical quantity.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

Wireless Communication Establishment Technology: As used in this disclosure, a wireless communication establishment technology refers to technology that establishes a wireless communication link between a first logical device and a second logical device. Usually, the operation of a wireless communication establishment technology is initiated by the push of a button. An example of such a technology is the WiFi™ protected setup technology (WPS™).

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A sports disc locator system comprising
wherein the sports disc locator system comprises a sports disk, a tracking disk, and a control circuit;
wherein the control circuit mounts in the tracking disk;
wherein the tracking disk attaches to the sports disk;
wherein the disk housing further comprises disk structure and a plurality of balancing weights;
wherein the plurality of balancing weights mount in the disk structure;
wherein the disk structure is a disk-shaped structure;
wherein the disk structure is the mechanical structure that forms the primary shape of the tracking disk;
wherein the control circuit mounts in the disk structure;
wherein each balancing weight selected from the plurality of balancing weights mounts in the disk structure;
wherein each balancing weight selected from the plurality of balancing weights is a disk shaped structure;
wherein each balancing weight selected from the plurality of balancing weights forms a mass that is contained within the disk structure;
wherein the position, size and weight of each balancing weight selected from the plurality of balancing weights is selected such that the center of mass of the combination disk housing and the control circuit aligns with the center axis of the disk shape of the disk housing.

2. The sports disc locator system according to claim 1 wherein the sports disc locator system is a flying disk;
wherein the sports disc locator system locates the sports disk after the sports disk has been thrown.

3. The sports disc locator system according to claim 2 wherein the control circuit is a beacon;
wherein the control circuit generates a visible signal used to locate the sports disk;
wherein the control circuit generates an audible signal used to locate the sports disk;
wherein the control signal transmits the GPS coordinates of the sports disc locator system to a personal data device.

4. The sports disc locator system according to claim 3 wherein the sports disk is a disk shaped structure;
wherein the sports disk is formed with a pan structure;
wherein the sports disk is a flying structure.

5. The sports disc locator system according to claim 4 wherein the sports disk comprises a closed face, an open face, and a lateral face structure;
wherein the closed face is the closed face of the pan structure of the sports disk;
wherein the closed face forms the superior surface of the sports disk as the sports disk flies through the air;
wherein the open face is the open face of the pan structure of the sports disk;
wherein the closed face further comprises an exterior surface and an interior surface;
wherein the exterior surface of the closed face that forms the outer surface of the pan shape of the sports disk;
wherein the exterior surface forms the superior surface of the sports disk when the sports disc locator system flies through the air;
wherein the interior surface forms the surface of the closed face that forms the boundary of the hollow space formed by the pan structure of the sports disk;
wherein the interior surface is the surface of the closed face that is distal from the exterior surface;
wherein the open face forms the inferior surface of the sports disk as the sports disk flies through the air;
wherein the open face is the face of the sports disk that is distal from the closed face;
wherein the lateral face structure attaches to the interior surface of the closed face;
wherein the lateral face structure forms a structure that projects away from the closed face in the inferior direction as the sports disk flies through the air.

6. The sports disc locator system according to claim 5
wherein the tracking disk is a disk shaped structure;
wherein the tracking disk attaches to the interior surface of the closed face of the sports disk;
wherein the tracking disk is geometrically similar to the closed face of the interior surface such that the tracking disk sits flush against the interior surface;
wherein the control circuit is contained within the tracking disk;
wherein the tracking disk secures the control circuit to the interior surface of the closed face of the sports disk;
wherein the tracking disk attaches to the sports disk such that the center axis of the disk shape of the tracking disk aligns with the center axis of the disk shape of the sports disk;
wherein the center axes of the tracking disk and the sports disk align with the axis of rotation of the sports disk when the sports disk flies through the air.

7. The sports disc locator system according to claim 6
wherein the tracking disk comprises a disk housing and an adhesive;
wherein the adhesive is a chemical compound;
wherein the adhesive is applied to the face of the disk housing that is geometrically similar to the interior surface of the closed face;
wherein the adhesive adheres the disk housing to the interior surface.

8. The sports disc locator system according to claim 7
wherein the disk housing is a disk shaped structure;
wherein the disk housing forms the primary shape of the tracking disk;
wherein the disk housing forms the structure that contains the control circuit;
wherein the disk housing attaches to the interior surface of the closed face of the sports disk;
wherein the disk housing is geometrically similar to the interior surface of the closed face such that the disk housing sits flush against the interior surface.

9. The sports disc locator system according to claim 8
wherein the control circuit is contained within the disk housing;
wherein the disk housing secures the control circuit to the interior surface of the closed face of the sports disk.

10. The sports disc locator system according to claim 9
wherein the disk housing attaches to the sports disk such that the center axis of the disk shape of the disk housing aligns with the center axis of the disk shape of the sports disk;
wherein the center axes of the disk housing and the sports disk align with the axis of rotation of the sports disk when the sports disk flies through the air.

11. The sports disc locator system according to claim 10
wherein the control circuit is an electric circuit;
wherein the control circuit forms the beacon that identifies the location of the sports disc locator system;

wherein the control circuit generates a visible light used to identify the location of the sports disc locator system;

wherein the control circuit generates an audible sound used to identify the location of the sports disc locator system;

wherein the control circuit determines the GPS coordinates of the sports disc locator system;

wherein the control circuit transmits the GPS coordinates of the sports disc locator system to a personal data device.

12. The sports disc locator system according to claim 11 wherein the control circuit comprises a logic module, a communication module, a GPS module, a speaker, a lamp circuit, a power switch, and a power source;

wherein the logic module, the communication module, the GPS module, the speaker, the lamp circuit, the power switch, and the power source are electrically interconnected;

wherein the communication module further comprises a wireless communication link and a personal data device;

wherein the communication module forms the wireless communication link between the control circuit and the personal data device.

13. The sports disc locator system according to claim 12 wherein the logic module is a programmable electronic device;

wherein the communication module is a wireless electronic communication device that allows the logic module to wirelessly communicate with a personal data device;

wherein the GPS module is an electrical device that communicates with the GPS to determine the GPS coordinates of the GPS module;

wherein when queried by the logic module, the GPS module transfers the GPS coordinates to the logic module.

14. The sports disc locator system according to claim 13 wherein the personal data device is a programmable electrical device;

wherein the personal data device transmits operating instructions over the wireless communication link to the control circuit;

wherein the communication module receives the transmitted operating instructions and relays the received operating instructions to the logic module;

wherein the personal data device transmits instructions to the logic module that:
a) initiate the illumination of the lamp circuit and an announcement by the speaker; and, b) extinguishes the illumination of the lamp circuit and discontinues the announcement by the speaker;

wherein the personal data device further transmits instructions to the logic module initiating the logic module to:
a) query the GPS module for the GPS coordinates of the GPS module; and, b) transmit the received GPS coordinates over the wireless communication link to the personal data device;

wherein the communication module electrically connects to the logic module.

15. The sports disc locator system according to claim 14 wherein the logic module controls the operation of the communication module;

wherein the GPS module electrically connects to the logic module;

wherein the logic module controls the operation of the GPS module;

wherein the speaker electrically connects to the logic module;

wherein the logic module controls the operation of the speaker;

wherein the lamp circuit electrically connects to the logic module;

wherein the logic module controls the operation of the lamp circuit.

16. The sports disc locator system according to claim 15 wherein the speaker is transducer;

wherein the speaker converts electric energy into an audible sound;

wherein the speaker electrically connects to the logic module;

wherein the speaker receives electric energy from the logic module;

wherein the speaker converts the received energy into an audible sound used to locate the sports disc locator system;

wherein the lamp circuit is an electric circuit;

wherein the lamp circuit electrically connects to the logic module;

wherein the lamp circuit receives electric energy from the logic module;

wherein the lamp circuit converts the received energy into a visible illumination used to locate the logic module;

wherein the power switch is a maintained switch;

wherein the power switch controls the flow of electric energy out of the power source;

wherein the power switch controls the flow of electric energy into the logic module;

wherein the power switch controls the flow of electric energy into the communication module;

wherein the power switch controls the flow of electric energy into the GPS module;

wherein by controlling the flow of electric energy is meant that the power switch enables and disables the flow of electric energy into the logic module, the communication module, and the GPS module;

wherein the power source is an externally provided source of electric energy.

\* \* \* \* \*